(12) United States Patent
Sundholm

(10) Patent No.: US 9,758,320 B2
(45) Date of Patent: Sep. 12, 2017

(54) METHOD AND APPARATUS FOR TREATING THE OUTLET AIR OF A PNEUMATIC WASTE CONVEYING SYSTEM

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 209 days.

(21) Appl. No.: 14/386,487

(22) PCT Filed: Mar. 7, 2013

(86) PCT No.: PCT/FI2013/050254
§ 371 (c)(1),
(2) Date: Sep. 19, 2014

(87) PCT Pub. No.: WO2013/140031
PCT Pub. Date: Sep. 26, 2013

(65) Prior Publication Data
US 2015/0050091 A1 Feb. 19, 2015

(30) Foreign Application Priority Data

Mar. 21, 2012 (FI) ...................................... 20125315

(51) Int. Cl.
*B65G 53/24* (2006.01)
*B65G 53/50* (2006.01)
(Continued)

(52) U.S. Cl.
CPC .............. *B65G 53/50* (2013.01); *B65F 5/005* (2013.01); *B65G 53/24* (2013.01); *F04C 18/126* (2013.01);
(Continued)

(58) Field of Classification Search
CPC ..... B65F 5/005; B65F 2210/188; B65G 53/24
(Continued)

(56) References Cited

U.S. PATENT DOCUMENTS 2,489,887 A 11/1949 Houghton
4,394,259 A 7/1983 Benny et al.
(Continued)

FOREIGN PATENT DOCUMENTS

CN 101351395 A 1/2009
CN 101903261 A 12/2010
(Continued)

OTHER PUBLICATIONS

Supplementary European Search Report for European Application No. 13763751.8, dated Oct. 13, 2015.
(Continued)

*Primary Examiner* — Joseph Dillon, Jr.
(74) *Attorney, Agent, or Firm* — Birch, Stewart, Kolasch & Birch, LLP

(57) ABSTRACT

Method for treating outlet air in a pneumatic waste conveying system, in which the outlet air is at least partly the conveying air to be used in waste conveying. In the method in a first phase additional air is brought into the body of conveying air in the partial-vacuum generator of the pneumatic waste conveying system before the output aperture of the partial-vacuum generator, and that in the method in a second phase additional air is brought into the body of outlet air as a consequence of the suction effect brought about by the outlet air in such a way that the outlet air and the additional air mix with each other at least partly. The invention also relates to an apparatus.

11 Claims, 2 Drawing Sheets

(51) Int. Cl.
*F04C 29/04* (2006.01)
*F04C 18/12* (2006.01)
*B65F 5/00* (2006.01)

(52) U.S. Cl.
CPC ........ *F04C 29/042* (2013.01); *F04C 2240/30* (2013.01)

(58) Field of Classification Search
USPC .................. 406/151, 152, 153, 92, 173, 197
See application file for complete search history.

(56) References Cited

U.S. PATENT DOCUMENTS

| | | | | |
|---|---|---|---|---|
| 4,423,987 | A * | 1/1984 | Powers | B03B 9/06 141/104 |
| 5,033,914 | A * | 7/1991 | Wuertele | B65G 53/28 222/61 |
| 5,083,704 | A * | 1/1992 | Rounthwaite | B65F 1/0093 15/314 |
| 5,711,640 | A * | 1/1998 | Ahern | B65G 53/06 406/117 |
| 6,203,297 | B1 | 3/2001 | Patel | |
| 6,817,844 | B1 * | 11/2004 | Wang | F04C 27/004 137/557 |
| 7,080,960 | B2 * | 7/2006 | Burnett | B65G 43/08 406/11 |
| 7,226,280 | B1 | 6/2007 | Yokoi et al. | |
| 9,187,266 | B2 * | 11/2015 | Sundholm | B65G 53/26 |
| 2003/0080055 | A1 * | 5/2003 | Gross | B60R 15/04 210/620 |
| 2005/0074302 | A1 * | 4/2005 | Burnett | B65G 43/08 406/56 |
| 2006/0008329 | A1 * | 1/2006 | Gerber | B65G 53/66 406/14 |
| 2010/0303557 | A1 * | 12/2010 | Sundholm | B01D 47/06 406/47 |
| 2010/0310327 | A1 | 12/2010 | Sundholm | |
| 2011/0052335 | A1 * | 3/2011 | Haberl | F16L 3/16 406/151 |
| 2011/0097159 | A1 * | 4/2011 | Haberl | B65F 5/005 406/15 |
| 2011/0103901 | A1 | 5/2011 | Hetcher et al. | |
| 2012/0175294 | A1 * | 7/2012 | Kim | B01D 29/445 210/249 |
| 2013/0145573 | A1 * | 6/2013 | Bizhanzadeh | B65G 53/14 15/340.1 |
| 2013/0209182 | A1 | 8/2013 | Sundholm | |
| 2014/0202206 | A1 * | 7/2014 | Temple | B01D 53/75 62/617 |
| 2015/0299950 | A1 * | 10/2015 | Henriksson | D21B 1/32 162/4 |
| 2016/0178278 | A1 * | 6/2016 | Chang | F26B 5/04 34/266 |

FOREIGN PATENT DOCUMENTS

| | | |
|---|---|---|
| CN | 101903266 A | 12/2010 |
| CN | 101903267 A | 12/2010 |
| CN | 102310068 A | 1/2012 |
| EP | 0878672 A1 | 11/1998 |
| FI | 20085141 A | 6/2009 |
| FI | 122673 B | 5/2012 |
| JP | 58-100002 A | 6/1983 |
| JP | 07-293221 A | 11/1995 |
| RU | 2010 115 332 A | 10/2011 |
| WO | 2315464 A1 | 1/1977 |
| WO | WO 2005/085104 A1 | 9/2005 |
| WO | WO 2005/085105 A1 | 9/2005 |
| WO | WO 2007/065966 A1 | 6/2007 |
| WO | WO 2008/108715 A1 | 9/2008 |
| WO | WO 2009/022964 A1 | 2/2009 |
| WO | WO 2009/037376 A1 | 3/2009 |
| WO | WO 2009/080880 A1 | 7/2009 |
| WO | WO 2009/080881 A1 | 7/2009 |
| WO | WO 2009/080882 A1 | 7/2009 |
| WO | WO 2009/080883 A1 | 7/2009 |
| WO | WO 2009/080884 A1 | 7/2009 |
| WO | WO 2009/080885 A1 | 7/2009 |
| WO | WO 2009/080886 A1 | 7/2009 |
| WO | WO 2009/080887 A1 | 7/2009 |
| WO | WO 2009/080888 A1 | 7/2009 |
| WO | WO 2009/145898 A1 | 12/2009 |
| WO | WO 2012/059625 A1 | 5/2012 |

OTHER PUBLICATIONS

Office Action issued in corresponding JP Application No. 2015-500955 on Jan. 13, 2017.

* cited by examiner

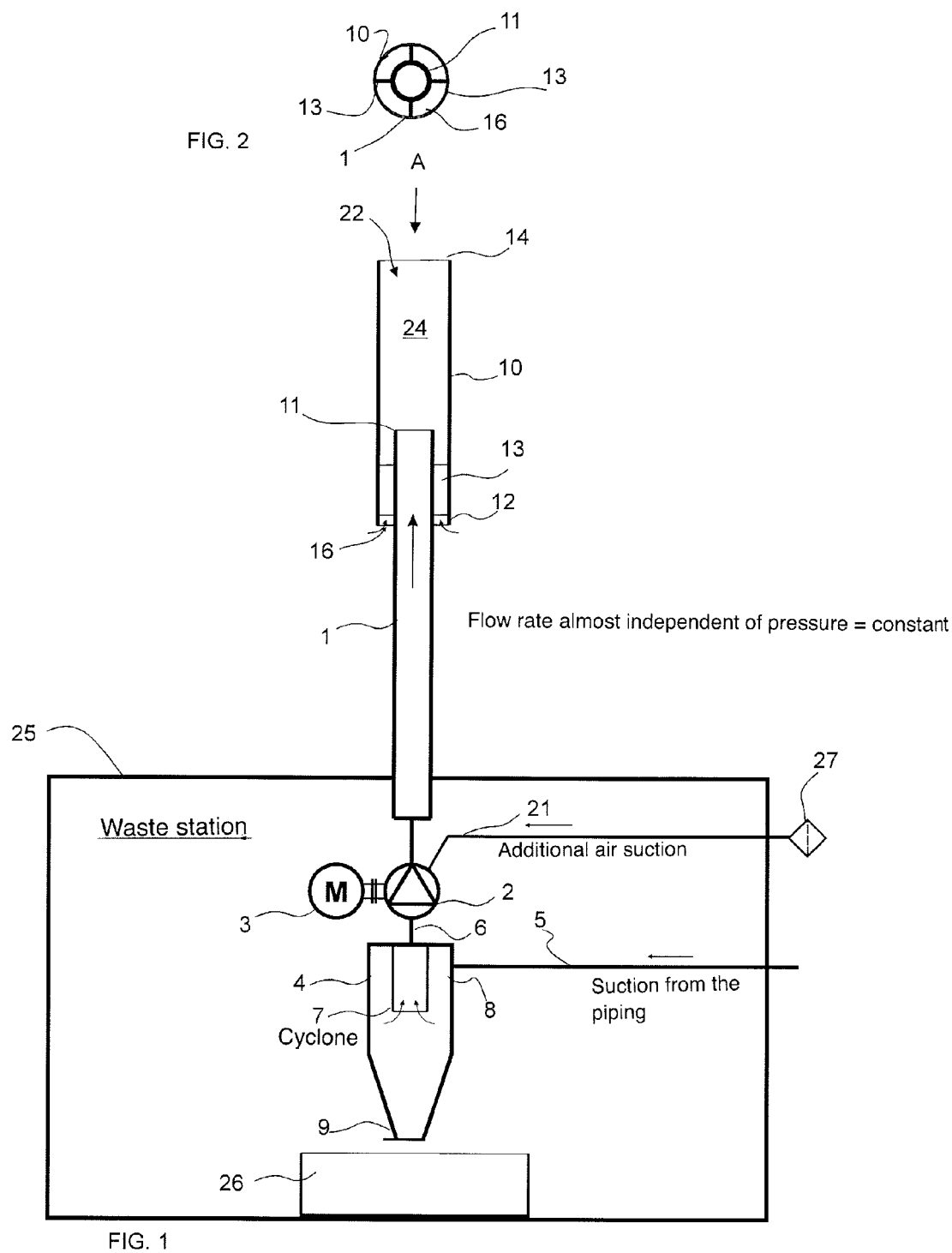

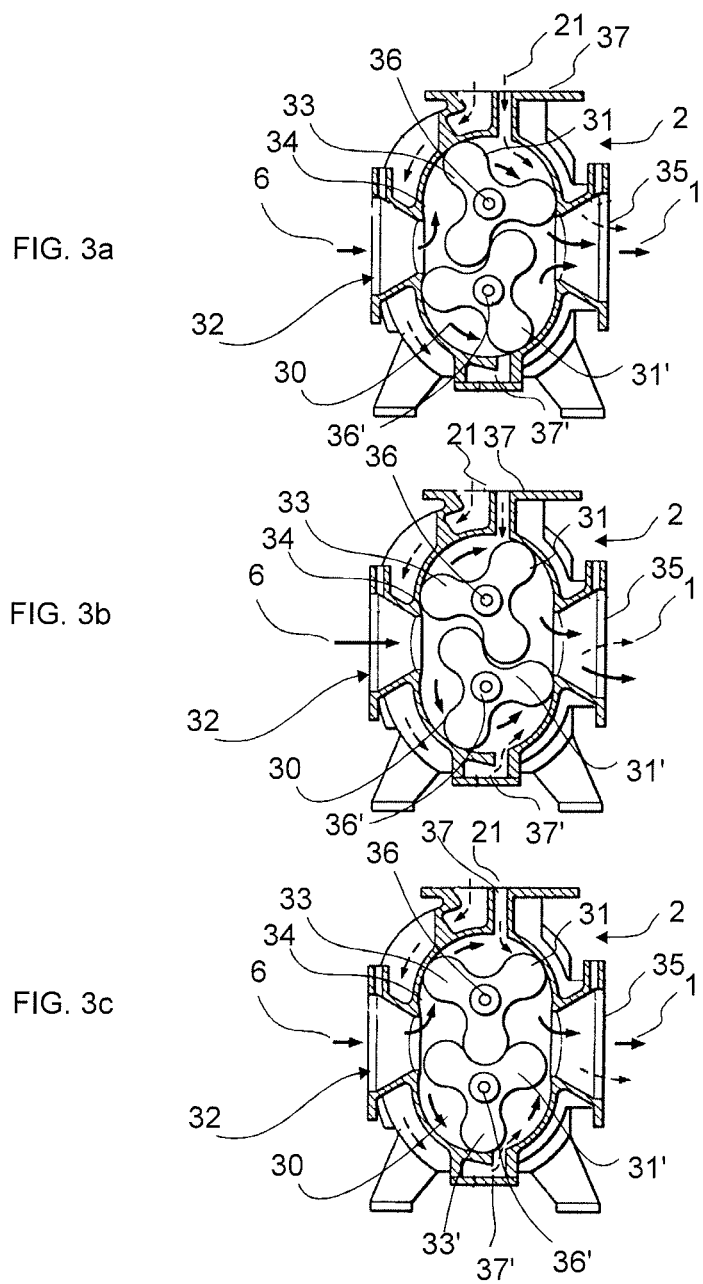

METHOD AND APPARATUS FOR TREATING THE OUTLET AIR OF A PNEUMATIC WASTE CONVEYING SYSTEM

BACKGROUND OF THE INVENTION

The object of the invention is a method for treating outlet air in a pneumatic waste conveying system, in which the outlet air is at least partly a conveying air to be used in waste conveying. The method includes the following steps, bringing air in a first phase wherein additional air is brought into a body of conveying air in a partial-vacuum generator of the pneumatic waste conveying system before an output aperture of the partial-vacuum generator and bringing air in a second phase wherein additional air is brought into a body of outlet air as a consequence of a suction effect brought about by the body of outlet air in such a way that the body of outlet air and the additional air at least partly mix with each other.

The object of the invention is also an apparatus for treating outlet air in a pneumatic waste conveying system, in which the outlet air is at least partly a conveying air to be used in waste conveying. The apparatus includes an outward blowing pipe with means for conducting the outlet air into the outward blowing pipe. A partial-vacuum generator includes means for bringing additional air into a body of conveying air in the partial-vacuum generator before an output aperture of the partial-vacuum generator. A means is provided for bringing additional air into a body of outlet air as a consequence of a suction effect brought about by the body of outlet air in such a way that the body of outlet air and the additional air at least partly mix with each other.

The invention relates generally to pneumatic material conveying systems, such as to partial-vacuum transporting systems, more particularly to the collection and conveying of wastes, such as to the conveying of household wastes. Such systems are presented in publications WO 2009/080880, WO 2009/080881, WO 2009/080882, WO 2009/080883, WO 2009/080884, WO 2009/080885, WO 2009/080886, WO 2009/080887 and WO 2009/080888, among others.

Systems wherein wastes are conveyed in piping by means of suction and/or by means of a pressure difference are known in the art. In these, wastes are conveyed long distances in conveying piping. The apparatuses are used for, among other things, the conveying of wastes in different institutions. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is regulated. In partial-vacuum conveying systems there are typically noise problems, as well as dust problems and fine particle problems, in the outlet pipe. Especially in waste-transporting systems odor nuisances, which are perceived as unpleasant, often occur in the outlet air. Efforts have been made to reduce odor nuisances by using a liquid-air-ejector as a partial-vacuum generator, the liquid, more particularly liquid mist, functioning as the operating medium of which ejector enhances the suction and binds odors and particles. Some such as these are presented in publications WO 2005/085104, WO 2005/085105 and WO2007/065966, among others. In addition, known in the art are solutions in which a liquid that reduces odor nuisances is brought into the ejector pump. These have functioned fairly well, but they require a certain type of partial-vacuum generator, which is not necessarily suited to all waste-transporting systems.

The aim of the present invention is to achieve an entirely new type of solution in connection with an outward blowing pipe of a waste system, by means of which solution the drawbacks of prior art solutions are avoided. Yet another aim of the invention is to achieve a solution by means of which the odor nuisances of the outlet air of the system as well as possible noise problems in connection with the outward blowing pipe can be decreased. Yet another aim is to enhance the efficiency of the treatment of outlet air in a pneumatic wastes conveying system.

BRIEF DESCRIPTION OF THE INVENTION

The invention is based on a concept in which additional air is brought into the conveying air before the output aperture of the partial-vacuum generating device and in a second phase additional air is brought into connection with the outlet air, which additional air dilutes the originators of odor in the air volume.

The method according to the invention is mainly characterized in that in the method in a first phase additional air is brought into the body of conveying air in the partial-vacuum generator of the pneumatic waste conveying system before the output aperture of the partial-vacuum generator and in that in the method in a second phase additional air is brought into the body of outlet air as a consequence of the suction effect brought about by the outlet air in such a way that the outlet air and the additional air mix with each other at least partly.

The apparatus according to the invention is mainly characterized in that the partial-vacuum generator comprises means for bringing additional air into the body of conveying air in the partial-vacuum generator before the output aperture of the partial-vacuum generator and in that the apparatus further comprises means for bringing additional air into the body of outlet air as a consequence of the suction effect brought about by the outlet air in such a way that the outlet air and the additional air mix with each other at least partly.

The solution according to the invention has a number of important advantages. With the solution according to the invention, it is possible to essentially reduce the odor nuisances of the outlet air by adding air to the body of outlet air. The property in which additional air is brought to, inter alia, prevent overheating of the partial-vacuum generator can surprisingly be utilized according to the invention also by bringing additional air into the conveying air. In this case the outblowing flow rate of the partial-vacuum generator can be boosted, or at least the outblowing flow rate can be kept roughly constant, independently of the underpressure of the conveying air on the suction side of the partial-vacuum generator. By means of the invention, the outblowing flow rate can be kept roughly constant and consequently additional air can also be mixed evenly into the body of outlet air in the second phase. By using a lobe rotor blower as a partial-vacuum generator in the invention, an effective solution for implementing the apparatus and the method of the invention is achieved.

BRIEF DESCRIPTION OF THE FIGURES

In the following, the invention will be described in more detail by the aid of an embodiment with reference to the attached drawings, wherein FIG. 1 presents a simplified cross-section of one device according to an embodiment of the invention, FIG. 2 presents the device of FIG. 1, as viewed from the direction A, FIGS. 3a-3c present a simplified cross-section of a partial-vacuum generator of a device according to an embodiment of the invention.

DETAILED DESCRIPTION OF THE INVENTION

FIG. 1 presents a simplified view of one solution of an embodiment of the invention. The partial-vacuum generator 2 of the pneumatic pipe conveying system for wastes, which is driven with a drive device 3, is connected with a pipeline 6 from the suction side of the partial-vacuum generator to a separating means 4, which can be e.g. a cyclone separator. The conveying piping 5 of the pneumatic waste-transporting system is connected to a separating means 4, e.g. to the top part 8 of the separating means, in which case the waste material to be conveyed separates from the conveying air in the separating means 4. The heavier particles and waste travel in the separating means, e.g. by means of centrifugal force and/or gravitational force, into the bottom part 9 of said separating means, from where they are emptied from time to time, e.g. into a waste container 26 below the separating means. The conveying air separated from the wastes, for its part, is conducted from the separating means 4, from the output aperture 7 of its top part, to the blowing side of the partial-vacuum generator 2 and onwards into the outward blowing pipe 1.

A second pipe part, i.e. an outer pipe 10, is arranged around the outward blowing pipe 1. The outer pipe 10 in FIG. 1 is a straight pipe part, the first end 12, the bottom end in the figure, of which extends from the outward blowing end 11 of the outward blowing pipe 1 at least to some extent towards the input direction of the outlet pipe, i.e. in the opposite direction with respect to the direction of travel of the gases of the outlet pipe 1. The second end 14, i.e. the top end in FIG. 1, of the outer pipe extends a distance from the outward blowing end 11 of the outward blowing pipe 10 in the main blowing direction (upwards in FIG. 1) of the gases of the outward blowing pipe. Tie parts 13 are arranged between the outward blowing pipe and the outer pipe. In the embodiment of FIG. 1, the outer pipe 10 is essentially co-axial with the outward blowing pipe 1. A ring-shaped space, which is bounded by the outer pipe and the outward blowing pipe and also the tie parts 13, remains between the outward blowing pipes 1 and the outer pipe 10. There is an aperture 16 between the bottom part 12 of the outer pipe and the outward blowing pipe 1. When outlet air is blown from the outward blowing aperture of the outward blowing pipe 1 into the chamber 24, suction is produced between the outer pipe 10 and the outward blowing pipe 1, which suction pulls additional air from the aperture 16 between the bottom part 12 of the outer pipe and the outward blowing pipe 1. The additional air mixes in the chamber 24 into the outlet air coming from the outward blowing aperture of the outward blowing pipe 1 before the top end 14 of the outer pipe, in which case the air to be blown out from the output aperture 22 of the outer pipe contains, with respect to the air volume, fewer components causing an odor than just the air that is to be blown out from the outward blowing pipe. This reduces the perceived odor nuisance of the outlet air. According to the invention a supply air duct 21 is arranged in connection with the partial-vacuum generator 2, with which duct air is brought into the partial-vacuum generator. In the embodiment of the figure, the input air duct 21 comprises filtering means 27. The supply air duct 21 is connected, according to one embodiment, to the chamber space 30 of the partial-vacuum generator 2, into which chamber space the impeller, rotor 31 or corresponding of the partial-vacuum generator is fitted in a manner allowing it to be rotated. In one case the partial-vacuum generator is a positive displacement blower, more particularly a so-called lobe rotor blower. In this type of partial-vacuum generator there is one or more rotors 31, 31', which are arranged in a manner allowing them to be rotated in the chamber 30 of the pump, on a rotating shaft 36, 36'. The medium to be treated, in this case conveying air, is conducted along the duct 6 into the chamber space 30 of the partial-vacuum generator from the input aperture 32. The outer surface of the blade 33, 33' of each rotor 31, 31' extends with a minimum clearance to the wall 34 of the chamber space 30. The medium, such as conveying air, to be conducted into the chamber space 30 remains between the wall 34 of the chamber space 30 and a blade 33, 33' of a rotor, the rotors 31, 31' when they rotate around the shaft 36, 36' form a partial vacuum and move the conveying air in the chamber from the input aperture towards the output aperture 35.

Known in the art are lobe rotor blowers in which additional air is brought into the chamber to prevent overheating of the partial-vacuum generator. One such is presented in publication U.S. Pat. No. 6,203,297; the solution in question is only an example and other corresponding apparatuses are on the market. The property in which additional air is brought to, inter alia, prevent overheating can surprisingly also be utilized according to the invention in bringing additional air into the conveying air, for boosting the out-blowing flow rate of its partial-vacuum generator, or at least for keeping it roughly constant independently of the under-pressure of the conveying air on the suction side of the partial-vacuum generator.

FIGS. 3a-3c present a solution in which additional air 21 is brought into the chamber 30 with branch couplings 37, 37'. The branch couplings 37, 37' are arranged to bring additional air into the chamber 30 to separate sides of it. In the embodiment of FIGS. 3a-3c, there is a medium connection from the input of additional air both to the branch coupling 37 and to the branch coupling 37', in which case by means of one input a supply of additional air to two points in the chamber 30 can be achieved.

In practice, the shaft 36 is rotated with a drive device (not presented), such as an electric motor. This rotates the rotor 31 clockwise and the second rotor 31' arranged on the shaft 36' counterclockwise. A pocket remains between each two adjacent blades of a rotor, which pocket is, when the rotor rotates, from time to time in medium connection with the supply branch coupling 32 for receiving into it medium that is at a lower pressure. When they rotate the rotors convey the medium in the pocket between the blades of the rotor in the space bounded by the wall of the chamber 30 towards the output aperture 35 and onwards from there into a duct leading to the outward blowing pipe 1. This movement of conveying medium is described in drawings the 3a-3c with unbroken arrows.

The blades 33, 33' of the rotors as they rotate past the supply branch coupling 37, 37' for additional air pull additional air into the chamber 30, where it mixes into the conveying air at the same time cooling the conveying air and the partial-vacuum generator. The coming of additional air into the chamber is described with arrows drawn with a dashed line in FIGS. 3a-3c.

In ordinary partial-vacuum generators, the air volume varies in the outward blowing pipe according to what the suction underpressure is. For example, with 50% underpressure, the flow rate of the outlet air is only approx. 50% compared to normal pressure.

This can be significantly improved in such a way that according to the invention a pump device is applied as a partial-vacuum generator, such as in FIGS. 3a-3c, which pump device comprises a pump for bringing additional air into the chamber space 30 for cooling the exhaust air in order to prevent overheating. Some additional air, preferably an amount corresponding to the underpressure, is conducted into the chamber space 30 of the partial-vacuum generator from the supply duct 21 for additional air, in which case the air volume blown out by the partial-vacuum generator is almost constant. At the same time it cools the outlet air.

According to the invention additional air is brought into the body of conveying air in two phases, in the first phase into the chamber of the partial-vacuum generator before its output aperture and in the second phase in connection with the outward blowing pipe, e.g. as is explained in the preceding. It is also possible that additional air is brought into the outlet air in a number of further phases.

From the at least one aperture 16 formed in the outer pipe 10 additional air is conducted from the effect of suction into the body of outlet air and of air conducted from the waste station, in which case the particles causing an odor nuisance decrease in relation to the total volume of air and the perceived odor nuisance of the air to be conducted out via the output aperture of the outer pipe decreases.

The invention thus relates to a method for treating outlet air in a pneumatic waste conveying system, in which the outlet air is at least partly the conveying air to be used in waste conveying. In the method in a first phase additional air is brought into the body of conveying air in the partial-vacuum generator 2 of the pneumatic waste conveying system before the output aperture 35 of the partial-vacuum generator, and that in the method in a second phase additional air is brought into the body of outlet air as a consequence of the suction effect brought about by the outlet air in such a way that the outlet air and the additional air mix with each other at least partly.

According to one preferred embodiment in the second phase the outlet air is blown from the outward blowing pipe 1 into a chamber 24 comprising at least one output aperture 22 and one second aperture 16, in which second aperture a suction effect is achieved with the blowing of the outlet air in such a way that additional air is brought into the body of outlet air in the chamber via the at least one second aperture 16 as a consequence of the suction effect achieved with the outlet air, and that the outlet air and the additional air mix with each other at least partly in the chamber 24 before the output aperture 22, from which the mixture of outlet air and additional air is conducted away.

According to one preferred embodiment the chamber 24 is formed from an outer pipe 10 arranged around at least the outward blowing end 11 of the outward blowing pipe 1.

According to one preferred embodiment at least one second aperture 16 has been formed between the bottom part 12 of the outer pipe 10 and the outward blowing pipe 1.

According to one preferred embodiment in the method the outblowing flow rate of the partial-vacuum generator 2 is kept fairly constant with the imports of additional air of the first phase.

According to one preferred embodiment in the method the outblowing flow rate of the partial-vacuum generator 2 is maintained almost independently of the pressure of the suction side of the partial-vacuum generator 2.

According to one preferred embodiment the partial-vacuum generator 2 is a lobe rotor blower.

According to one preferred embodiment the partial-vacuum generator is cooled with the additional air brought into the partial-vacuum generator 2.

According to one preferred embodiment the outlet air is cooled with the additional air volume brought into the partial-vacuum generator 2.

The invention also relates to an apparatus for treating outlet air in a pneumatic waste conveying system, in which the outlet air is at least partly the conveying air to be used in waste conveying, which apparatus comprises an outward blowing pipe 1 and also devices for conducting the outlet air into the outward blowing pipe. The partial-vacuum generator comprises means 21, 37, 37' for bringing additional air into the body of conveying air in the partial-vacuum generator 2 before the output aperture 35 of the partial-vacuum generator 2, and that the apparatus further comprises means for bringing additional air into the body of outlet air as a consequence of the suction effect brought about by the outlet air in such a way that the outlet air and the additional air mix with each other at least partly.

According to one preferred embodiment the outward blowing end 11 of the outward blowing pipe 1 has been fitted into a chamber 24 comprising at least one output aperture 22 and one second aperture 16, in which at least one second aperture 16 a suction effect is achieved with the blowing of the outlet air in such a way that additional air is brought into the body of outlet air in the chamber via the at least one second aperture 16 as a consequence of the suction effect achieved with the outlet air, and that the outlet air and the additional air are configured to mix with each other at least partly in the chamber 24 before the output aperture 22, from which the mixture of outlet air and additional air is conducted away.

According to one preferred embodiment the chamber 24 has been formed from an outer pipe 10 arranged around at least the outward blowing end 11 of the outward blowing pipe 1.

According to one preferred embodiment at least one second aperture 16 has been formed between the bottom part 12 of the outer pipe 10 and the outward blowing pipe 1.

According to one preferred embodiment the partial-vacuum generator 2 is a lobe ro tor blower.

According to one preferred embodiment the partial-vacuum generator is a lobe rotor blower, which comprises two rotors 31, 31', each of which comprises three blades 33, 33'.

According to one preferred embodiment the partial-vacuum generator 2 comprises two supply branch couplings 37, 37' for additional air.

According to one preferred embodiment additional air is configured to be supplied into the chamber 30 of the partial-vacuum generator 2 in such a way that the outblowing flow rate of the partial-vacuum generator remains fairly constant.

According to one preferred embodiment additional air is configured to be supplied into the chamber 30 of the partial-vacuum generator 2 in such a way that the outblowing flow rate of the partial-vacuum generator 2 is maintained almost independently of the pressure of the suction side of the partial-vacuum generator 2.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for treating outlet air in a pneumatic waste conveying system comprises the following steps:
   supplying a first body of conveying air in a first phase to the pneumatic waste conveying system;
   supplying additional air into the first body of conveying air in a partial-vacuum generator of the pneumatic waste conveying system before an output aperture of the partial-vacuum generator to form a second body of outlet air;
   supplying a third body of air into the second body of outlet air wherein the third body of air is brought into the second body of outlet air as a consequence of a suction effect brought about by the second body of outlet air in such a way that the second body of outlet air and the third body of air at least partly mix with each other; and
   reducing an odor of the conveying air by supplying the third body of air into the second body of outlet air by use of the suction effect.

2. The method according to claim 1, wherein the second body of outlet air is blown from an outward blowing pipe into a chamber comprising at least one output aperture and one second aperture, in which second aperture a suction effect is achieved with the blowing of the second body of outlet air in such a way that third body of air is brought into the second body of outlet air in the chamber via the at least one second aperture as a consequence of the suction effect achieved with the second body of outlet air, and in that the second body of outlet air and the third body of air at least partly mix with each other in the chamber before the output aperture, from which the mixture of the second body of outlet air and third body of air is conducted away.

3. The method according to claim 1, wherein the chamber is formed from an outer pipe arranged around at least an outward blowing end of an outward blowing pipe.

4. The method according to claim 1, wherein at least one second aperture has been formed between a bottom part of an outer pipe and an outward blowing pipe.

5. The method according to claim 1, wherein the method an outblowing flow rate of the partial-vacuum generator is kept fairly constant with imports of additional air of the first phase.

6. The method according to claim 1, wherein the method an outblowing flow rate of the partial-vacuum generator is maintained almost independently of a pressure of a suction side of the partial-vacuum generator.

7. The method according to claim 1, wherein the partial-vacuum generator is a lobe rotor blower.

8. The method according to claim 1, wherein the partial-vacuum generator is cooled with the additional air brought into the partial-vacuum generator.

9. The method according to claim 1, wherein the outlet air is cooled with an additional air volume brought into the partial-vacuum generator.

10. The method according to claim 2, wherein the chamber is formed from an outer pipe arranged around at least an outward blowing end of the outward blowing pipe.

11. The method according to claim 2, wherein at least one second aperture has been formed between a bottom part of an outer pipe and an outward blowing pipe.

* * * * *